3,497,601
SEED DISINFECTANT
Horst Werres, Berlin, Germany, and Dietrich Baumert, Guatemala, Guatemala, assignors to Schering, A.G., Berlin, Germany
No Drawing. Filed Aug. 30, 1966, Ser. No. 576,517
Claims priority, application Germany, Sept. 14, 1965, Sch 37,719
Int. Cl. A01n 21/00, 9/20
U.S. Cl. 424—325
3 Claims

ABSTRACT OF THE DISCLOSURE

This invention relates to the protection of seeds from fungal attack whereby said seeds are contacted with 1-methoxy-2-aminoethane prior to planting.

---

This invention relates to seed disinfectants and to their use in combatting fungus infections of plants, particularly cereal crops.

It has been found that 1-methoxy-2-aminoethane, the compound of the formula $$CH_3O-CH_2-CH_2-NH_2$$

combines relatively low toxicity to humans and to warm-blooded animals with strong fungicidal effects. Seed disinfectant compositions containing this compound as an active agent are much less toxic than the commonly employed mercurial fungicides, and have stronger fungicidal activity than the relatively nontoxic, known, organic fungicides such as TMTD, tetramethylthiuramdisulfide or (bis dimethyl) thiocarbamoyl disulfide.

The seed disinfectant compositions of this invention are highly effective against infections of cereal seeds caused by parasitic fungi and imperfect fungi of the genera Fusarium, Tilletia, Helminthosporium and Ustilago, and are superior to TMTD in this respect while lacking the toxicity of the mercurial disinfectants.

The active agent of the invention is known and may be prepared by known methods. It may be employed in seed disinfectant compositions as only the active agent, or in combination with other crop protecting agents such as insecticides. The compositions may be formulated in the usual manner. The compositions may be solid or liquid according to the nature of the inert carriers or diluting agents employed, and may additionally contain wetting and other adhesion improving agents, emulsifiers, and dispersing agents. The compositions are prepared by mixing the ingredients in the manner common in this art. Coloring matter may be added for identification purposes.

Suitable solid carriers and excipients include kaolin, talcum powder, finely divided silicon dioxide of natural or synthetic origin, attaclay, and other types of clay. Liquids suitable as solvents or as dispersion media for the active agents include alcohols and ketones, dimethylformamide, dimethylsulfoxide, water, and aliphatic and aromatic hydrocarbons. A wide choice of surfactants is available for compounding because of the stability of the active agents. Lignosulfonic acids and their salts, alkylated benzene sulfonic acids and their salts, sulfonated amides of carboxylic acids and their salts, polyethoxylated amines, alcohols, and phenols, and the sulfates of such polyethoxylated compounds are typical of the surfactants useful in the compositions of the invention.

The chemical nature of the colorant employed is relatively unimportant. Rosaniline or any other dye which gives a distinct color to the seed disinfectant composition may be employed.

The concentration of the active agents of the invention in the seed disinfectant compositions is usually between 10 and 75 percent, and a concentration of 20 to 50 percent by weight is most generally applicable. The ratio of active and inert ingredients affects the application rate in an obvious manner, and may be selected to suit a desired application method.

Typically, a dry seed disinfectant composition of the invention may contain 50.0% of the active agent, 40.0% synthetic silicon dioxide, and 10.0% talcum. It is prepared by mixing the ingredients and grinding the mixture to a uniform, very small particle size suitable for dusting. It is applied to the seeds by tumbling or in any other manner that ensures contact between the disinfectant composition and the seeds.

A liquid composition is obtained by dispersing 20.0% of an active agent of the invention and 0.2% of a soluble colorant in 79.8 percent dimethylsulfoxide or dimethylformamide, all percentages being by weight. Liquid compositions may be contacted with seeds by spraying the seeds.

The effects achieved are not affected by the inert diluents or colorants, and only the active agents are specifically referred to in the following examples which illustrate the fungicidal effects of the compositions of the invention.

EXAMPLE 1

Rye seeds naturally infected with Fusarium nivale were partly mixed with the seed disinfectant of the invention and were then planted in non sterile soil in clay containers. The containers were stored for two months in a room refrigerated to a temperature of 7° to 12° C. and were exposed each day to artificial light for 14 hours. The protection obtained was evaluated quantitatively on a scale in which the infection of rye plants grown from untreated seed was assigned a value of 100. 375 g. of 1-methoxy-2-aminoethane per 100 kg. of seed reduced the rate of infection of the dye plants from 100 to 10.

EXAMPLE 2

Wheat grains were infected with Tilletia caries by shaking with spores of the fungus in a ratio of 1 kg. of grains per 3 g. of spores. A portion of the infected grains was then contacted with a fungicidal composition containing 250 g. of 1-methoxy-2-aminoethane per 100 kg. of the wheat grains, and open field plots were seeded with the treated and untreated wheat grains. When the ears infected with smut were counted at harvest time, 72.7% of the ears grown from infected but otherwise untreated seeds showed smut, while the infection was reduced to 0.3% in the wheat grown from seeds treated according to this invention.

EXAMPLE 3

Barley seeds naturally infected with Helminthosporium gramineum were used for seeding open field plots. A portion of the seeds was treated with 1-methoxy-2-aminoethane in the form of a liquid composition at a rate of 375 grams of the active agent per 100 kg. of seeds prior to planting.

The stalks of barley sprouted from the treated seeds were completely free of streak disease whereas the plants from the untreated seeds showed a disease rate of 14.7 percent.

EXAMPLE 4

Oat seeds naturally infected with Ustilago avenae were additionally infected according to the wet vacuum method (Purdy, Plat. Dis. Reptr., 1958, pp. 233–237). Batches of the infected seeds were treated with 1-methoxy-2-aminoethane, others with TMTD, and yet other were left untreated. Three sets of tests were made. The percentage of infected panicles of oat grown from the seeds was determined at harvest time.

TABLE

| Active agent | G. active agent per 100 kg. seed | Percent infected panicles | | |
|---|---|---|---|---|
| | | Test 1 | Test 2 | Test 3 |
| 1-methoxy-2-aminoethane | 563 | 2.8 | 1.67 | 0 |
| TMTD | 600 | 10.8 | 7.78 | |
| | 400 | | 10.28 | |
| Untreated controls | | 23.7 | 18.39 | 1.74 |

What is claimed is:

1. The method of protecting seeds from fungal attack comprising contacting said seeds prior to planting with a fungicidal amount of a composition comprising an inert carrier and the active ingredient 1-methoxy-2-aminoethane, said active ingredient being in a quantity of between 10 to 75% by weight of the total composition.

2. The method of claim 1 wherein the said inert carrier is selected from the group consisting of kaolin, talcum powder, finely divided silicon dioxide, attapulgus clay, dimethylformamide, dimethylsulfoxide, and water.

3. The method of claim 1 in which the quantity of said active ingredient is in the quantity of between 20 to 50% by weight of the total composition.

References Cited

UNITED STATES PATENTS 2,302,388  11/1942  Hester et al. _____ 167—22

OTHER REFERENCES

Chemical Abstracts, vol. 58, 1963, pp. 8904–8905.

ALBERT T. MEYERS, Primary Examiner

FREDERICK E. WADDELL, Asistant Examiner

U.S. Cl. X.R.

424—342